June 7, 1938.  P. A. VAN KEMPEN  2,119,863
MACHINE FOR MEASURING AND MARKING SHEETS OF MATERIAL
Filed Dec. 1, 1934  3 Sheets-Sheet 1
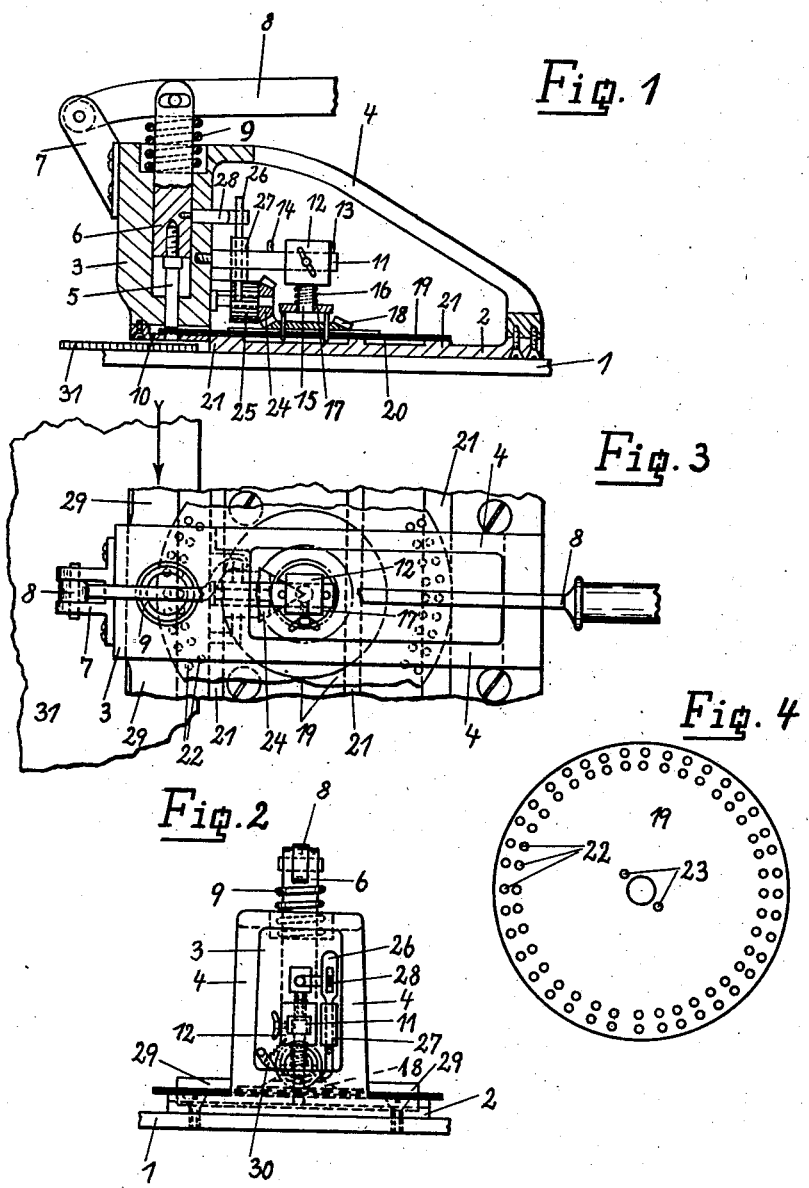
Inventor
Peter Anton van Kempen

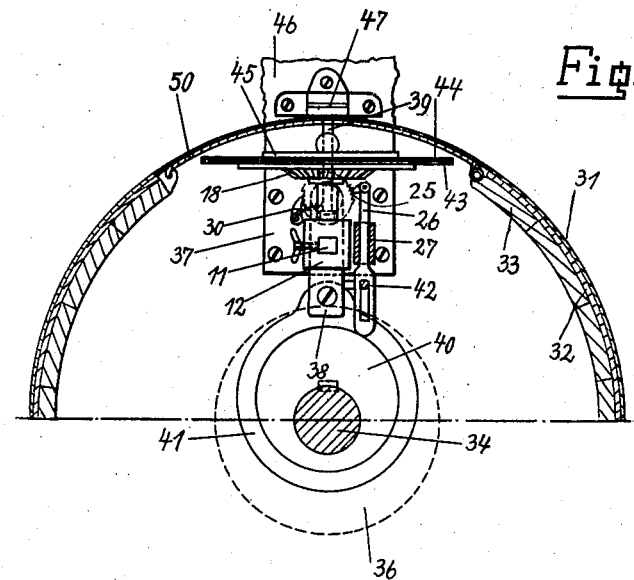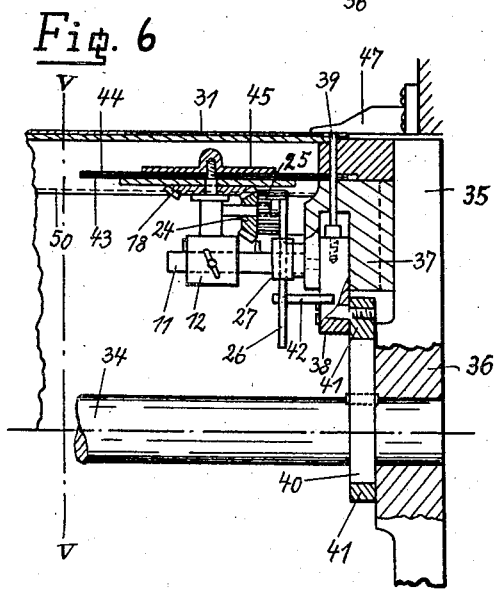

June 7, 1938.  P. A. VAN KEMPEN  2,119,863
MACHINE FOR MEASURING AND MARKING SHEETS OF MATERIAL
Filed Dec. 1, 1934  3 Sheets-Sheet 3

Inventor:
Peter Anton
van Kempen

Patented June 7, 1938

2,119,863

UNITED STATES PATENT OFFICE 2,119,863

MACHINE FOR MEASURING AND MARKING SHEETS OF MATERIAL

Peter Anton van Kempen, Zittau, Germany

Application December 1, 1934, Serial No. 755,610
In Germany December 1, 1933

5 Claims. (Cl. 216—17)

It is known to mark sheets of material according to length by attaching paper measurement marks to the edge of the sheet of material with the aid of wire staples or adhesive media, which must be either moistened or warmed.

The subject of the present invention is a process and the mechanical arrangement associated therewith, for mechanically securing the measurement marks to the edges of the sheet of material merely by pressing, with the aid of a special adhesive which does not necessitate troublesome moistening or tedious heating or, in particular, complicated apparatus easily susceptible of breaking down in operation associated therewith, the sheet of material being, if necessary, simultaneously measured. To this end, according to the invention, use is made of an arrangement which, when each unit of length of the material in question is measured off, stamps out a measurement mark and presses it on to the edge of the sheet. The arrangement is such that, after each marking operation, the next measurement mark is automatically brought into the measuring and marking position for use during the next operation.

The marking apparatus and the measuring device of the machine have the advantage of being particularly simple and of thus affording increased reliability in operation and maximum output.

Two constructional forms of a machine according to the invention for the use of circular marking discs, such as are illustrated in Figures 4 and 14, in Figures 1 to 3 and 8 to 13 for fitting to a measuring machine and in Figures 5 to 7 for insertion in the measuring drum of a measuring machine, are illustrated in the accompanying drawings, wherein:

Figure 1 is a longitudinal central section through a marking apparatus for fitting to a measuring machine with a goods delivery roller, Figure 2 is an elevation of the same apparatus, viewed in a direction at right angles to the direction of travel of the goods, Figure 3 is a plan of the same apparatus, Figure 4 is a plan of a marking disc for both constructional forms, Figure 5 is a vertical partial cross-section through a measuring drum with built-in marking apparatus, Figure 6 is a partial longitudinal central section through this measuring drum, and Figure 7 is a plan of a measurement mark of special construction.

Figure 9:
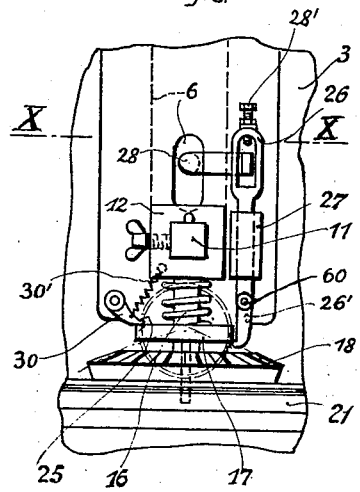
Fig. 9 is a back elevation of this part, the stirrup of the housing being taken away.
Figure 8:
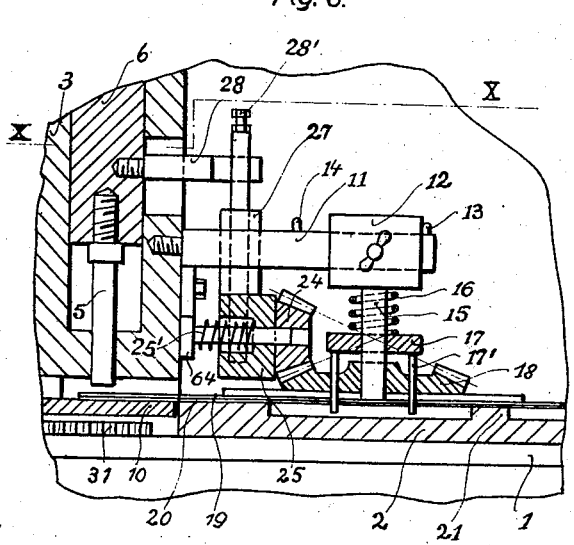
Fig. 8 is a part of the section shown in Fig. 1, on a larger scale, of a machine according to the invention.
Figure 11:
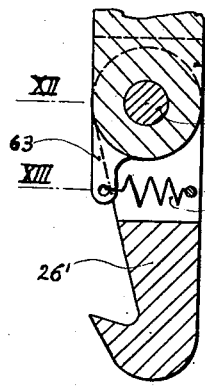
Fig. 11 is a vertical section of the link for moving the rotating mechanism of the mark disc, according to Fig. 9, on a larger scale.
Figure 10:
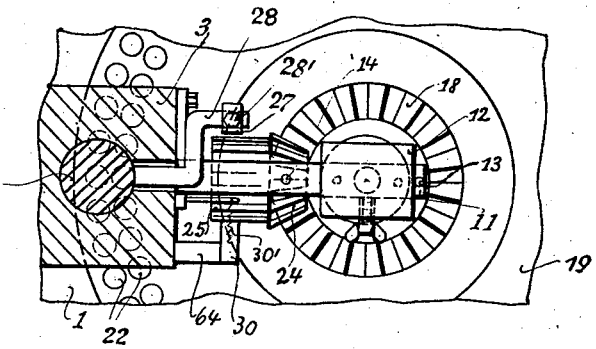
Fig. 10 is a plan view, in part in section according to the line X—X of Fig. 9, of the part shown in Figs. 8 and 9.
Figure 12:
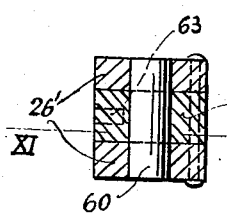
Figs. 12 and 13 are horizontal sections of said link according to the lines XII—XII respectively XIII—XIII in Fig. 11.
Figure 14:
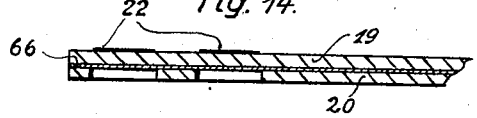
Fig. 14 is a vertical part section of the mark disc shown in Fig. 4, on a larger scale, together with the protective sheet.
Figure 13:
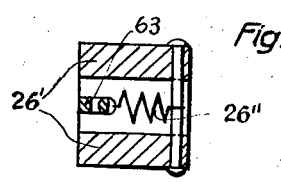

The constructional form of the marking apparatus shown in Figures 1–3, shows, mounted on a base plate 2, a housing body 3 having a stirrup 4 projecting for some distance and also connected at its end with the base plate. In a vertical aperture in the housing 3 is situated a punch holder 6, in the bottom of which is inserted a shorter, thinner punch 5, which slides in a corresponding bore in the housing. At the upper slotted end of the punch holder there engages, by means of a bolt, a lever 8, which is rotatably mounted at the front of the housing 3 in a supporting bracket 7 and carries a handle at its free end. About the punch holder 6 is disposed a helical spring 9, which engages at the bottom in a recess provided in the housing, and which rests at the top against the lever 8. Through a rearward recess in the housing 3, there projects outwardly a cranked bolt 28 secured in the punch holder 6 and passing through a slot provided in a control rod 26 and adjustably secured therein by a screw 28'. This control rod rests in a guide 27 and carries at its lower end in well known manner a pivotal tooth 26', which engages under spring action in a wide toothed wheel 25. Said tooth 26' consists of a sheet metal cover and a stiffening part 61 and is linked to the rod 26 by means of a bolt 60. The spring 26" is attached to a joining piece 63 of the rod 26. The toothed wheel 25 is rigidly connected with a bevel wheel 24 and arranged on a bolt secured to the rear side of the housing, the arrangement being such that the toothed wheel 25 is rotatable, axially displaceable under the action of a spring 25' and adjustable on its axis together with the bevel wheel 24 so that the bevel wheel 24 is in engagement with a horizontal bevel wheel 18, which is rotatably mounted on a vertical bolt 15. This bolt is displaceable along a horizontal square bolt 11 together with a housing 12, to which it is screwed and is adapted to be secured by a winged nut. Moreover, there rests on the bolt 15, so as to be freely movable, a circular plate 17, which is pressed by means of a spring 16 against the bevel wheel 18, and penetrates therethrough with two centering pins 17'. With their lower part, the centering pins extend through a paper disc 19 and a sheet-metal plate 20, which lies on strips 21 provided on the base plate 2. The sheet-metal plate 20 with the paper disc 19 also lies with one part on a cutting plate 10 provided with a guiding aperture for the punch 5, the said cutting plate being screwed to the housing 3. A pawl 30, linked to a bar 64, under the action of a spring 30', engages with the toothed wheel 25 opposite the tooth of the control rod 26. At the bottom of the housing 3 on both sides, there are secured by casting two eyes 29, to which the cutting plate 10 is screwed. The entire arrangement is secured to a measuring table 1 by means of a plurality of screws passing through the base plate 2. Figure 4 shows a marking disc 19, on which are situated marks 22 in two concentric rings. For the engagement of the centering pins 17' of the plate 17, holes 23 are provided. On its reverse side, the marking disc is provided with an adhesive which causes the mark to adhere firmly to the sheet of material merely by pressure and without heating or moistening.

When operating the arrangement, the hand lever 8 and consequently the punch holder 6 and, by means of the latter, the punch 5 are pressed downwards. The punch 5 stamps out of the disc 19 a mark 22 and presses it on to the sheet of material 31, to which it adheres firmly by means of its adhesive without moistening or heating. By the spring 9 the hand lever 8 is then swung upwards again, whereby the punch holder 6 and punch 5 also ascend. The control rod 26 is thus also moved upwards by means of the bolt 28 secured in the punch holder 6, and moves the toothed wheel 25 one step further forward and consequently also the disc 19 and the plate 20 by means of the bevel wheel 24, 18, so that the next mark 22 arrives in front of the stamping position. The next marking operation can thus be commenced.

When the outer ring of marks 22 has been completely stamped out of the disc 19, the housing 12 is shifted on the bolt 11, after loosening of the winged nut, from the stop 13 to the stop 14, so that one mark of the inner ring is situated exactly beneath the punch 5. In order to replace a completely used disc, the plate 17 is raised until its centering pins 17' are free of the holes 23 of the paper disc and the corresponding holes of the plate 20, whereupon the paper disc is laterally withdrawn with the plate. At the same time, a new disc 19 with a new plate 20 is inserted in such a manner that the holes 23 arrive exactly beneath the centering pins, so that the latter may easily be inserted therein.

Figures 5 and 6 show the insertion of a marking device in a measuring drum provided with a plush covering 32. The marking device is situated in a recess provided in the surface of the drum 33, and is accessible through a flap 50. The measuring drum has a shaft 34, from which the device is driven through an eccentric disc 40 and the ring 41 on the punch holder 38. The device is secured to the outer wall of the drum by means of a flange 37 and several screws. On the bevel wheel 18 lie a sheet-metal plate 44 and a paper disc 43, which is held fast by a screwed-on plate 45. In the free end of the punch holder 38 is secured a punch 39 which, in the position of rotation of the eccentric 40, 41 shown, extends through the housing and the outer wall of the drum to the sheet of material 31. Opposite the point at which the punch 39 leaves the drum, there is secured to the bearing bracket of the drum or at any other suitable place a block 47, which serves as support during the pressing on of the marks.

Figure 7 shows a special constructional form of a measurement mark 48 having two measurement figures 49, one of which shows the end of one unit of measurement (36 corresponding to 36 meters) and the other end of which shows, at the beginning of the following unit of measurement, the preceding length (36), it being possible to separate the two lengths of material between these figures.

According to Figures 5 and 6, only very slight alterations are required in the case of the insertion of the marking device in a measuring drum. In this case, the drive is effected from the shaft of the drum through the eccentric disc 40 and the eccentric ring 41, which moves the punch holder 38 and punch 39 up and down and thus drives the marking apparatus in the same manner as a hand lever. For holding the paper disc 43 together with the plate 44 on the plate connected with the bevel wheel 18, a plate 45 is mounted on a centre pin of this plate in such a manner that it may be secured, the paper disc 43 with the perforated plate 44 having previously been placed in position, and the centering pins not shown in the drawings having been introduced into the holes 23 (Fig. 4) provided therefore in the paper disc 43 and the plate 44. The stamping out of a mark takes place in a manner corresponding to that in which it takes place in the case of hand operation, but automatically after each rotation by means of the eccentric. The block 47 may, if necessary, be adjusted as desired both laterally and vertically. As the marking apparatus is easily accessible through the flap 50 provided in the periphery of the drum, the marking discs may, as will be seen from the above and from the drawings, be adjusted and replaced without difficulty, in a manner corresponding to that described in the case of the construction according to Figures 1 to 3.

In order that the length of the cut-off portion and that of the remaining portion of a sheet of material may readily be seen, the marks according to Figure 7 may preferably bear the figures for the commencing and end portions of the measured sections of material in different colors, for example, green for the beginning and red for the end. In the cutting-off, the double mark is then cut in the centre between the two equal figures, in such a manner that the green figure or mark accompanies the cut-off portion, while the red figure or mark remains on the remaining length and indicates the total length of the remaining material. The figures are either placed on a correspondingly colored background or printed in color.

Instead of as shown in Figure 4, the circular marking disc may have three or more rings of marks, in which case, instead of two, three or more positions of adjustment must then be provided on the bolt 11 for the support of the marking disc. It is advisable that the adhesive medium for the marks should contain rubber and that it should have the property of not drying when lying in air, but only when it is firmly pressed on the material. In the constructions of the marking device first described, the marking disc 19 is, for example, completely coated on the reverse side with such adhesive and made to adhere to the perforated plate 20 of sheet aluminum, cardboard, celluloid or the like, which serves as a protective disc, in such a manner that the marks 22 of the disc 19 and the corresponding holes in the plate 20, as also the centering holes in both plates, exactly coincide. The disc 19 then firmly adheres to the plate 20 in the correct position, while the reverse side of the marks 22 remain free with the adhesive medium, so that this adhesive medium cannot stick or contaminate when several discs are superimposed or when a new disc 19, 20 is inserted in the device, while, moreover, the adhesive medium is completely unimpaired and at disposal upon the pressing of the mark on to the sheet of material.

I claim:

1. Machine for marking sheets of material by means of measurement marks to be applied to the sheets of material consisting in combination of a circular disc containing the marks arranged in at least one circle concentric to said disc and provided, on their reverse side, with an adhesive containing rubber or the like which causes the marks to adhere to the sheets of material merely by pressure, without employing heat or liquid, a protective pattern sheet on the reverse side of the said mark disc having openings of at least the same diameter as the marks, a device for stamping out the marks and pressing them on to the said sheet, and a device for rotating said mark disc step-by-step after each stamping out of a mark for bringing the next mark to the stamping place.

2. Machine for marking sheets of material by means of measurement marks to be applied to the sheets of material consisting in combination of a circular disc containing the marks arranged in at least two circles concentric to said disc and provided, on their reverse side, with an adhesive containing rubber or the like which causes the marks to adhere to the sheets of material merely by pressure, without employing heat or liquid, a protective pattern sheet on the reverse side of the said mark disc having openings of at least the same diameter as the marks, a device for stamping out the marks and pressing them on to the said sheet, a device for adjusting and securing the axis of rotation of said disc, of said protective sheet and of the said device for rotating said disc and said sheet step-by-step in accordance with the distance of the mark to be stamped out and applied to the sheet of material from the axis of rotation.

3. Machine for marking sheets of material by means of measurement marks to be applied to the sheets of material consisting in combination of a circular disc containing the marks arranged in at least one circle concentric to said disc and provided, on their reverse side, with an adhesive containing rubber or the like which causes the marks to adhere to the sheets of material merely by pressure without employing heat or liquid, a protective pattern sheet on the reverse side of the said mark disc having openings of at least the same diameter as the marks, a device for stamping out the marks and pressing them on to the said sheet, and a device for rotating said mark disc step-by-step after each stamping out of a mark for bringing the next mark to the stamping place, said mark disc and said protective sheet being provided with at least one centering hole near the axis of rotation and adapted to engage with a corresponding centering pin at the plate carrying said mark disc and said protective sheet.

4. For a machine for marking sheets of material by means of measurement marks to be applied to the sheets of material a sheet containing measurement marks for being secured to sheets of material to be measured having the said measurement marks provided, on their reverse side, with an adhesive medium adhering merely by pressure, without employing heat or liquid and with a protective pattern sheet containing holes corresponding to the said measurement marks each of which being opposite to the corresponding hole.

5. For a machine for marking sheets of material by means of measurement marks to be applied to the sheets of material a sheet containing measurement marks for being secured to sheets of material to be measured having the said measurement marks provided, on their reverse side, with an adhesive medium adhering merely by pressure, without employing heat or liquid and with a protective pattern sheet containing holes corresponding to the said measurement marks each of which being opposite to the corresponding hole, the diameter of said holes being slightly larger than that of said marks.

PETER ANTON van KEMPEN.